US006454686B1

(12) United States Patent
McEachern

(10) Patent No.: US 6,454,686 B1
(45) Date of Patent: Sep. 24, 2002

(54) MODULAR MAGNETIC CYLINDER

(75) Inventor: David A. McEachern, St. Paul, MN (US)

(73) Assignee: T.D. Wright, Inc., St. Paul, MN (US)

( * ) Notice: Subject to any disclaimer, the term of this patent is extended or adjusted under 35 U.S.C. 154(b) by 0 days.

(21) Appl. No.: 09/845,102

(22) Filed: Apr. 30, 2001

(51) Int. Cl.[7] .................................... B23P 15/00

(52) U.S. Cl. .................... 492/8; 492/30; 335/302; 335/306

(58) Field of Search .................. 492/8, 30; 101/389.1, 101/378; 335/306, 302

(56) References Cited

U.S. PATENT DOCUMENTS

| | | | | | |
|---|---|---|---|---|---|
| 3,610,583 | A | * | 10/1971 | Ostrom | 198/835 |
| 3,721,189 | A | * | 3/1973 | Bray | 101/389.1 |
| 3,824,926 | A | * | 7/1974 | Fukuyama | 101/378 |
| 4,114,532 | A | * | 9/1978 | Arzoumanian | 101/93.48 |
| 4,625,928 | A | * | 12/1986 | Peekna | 101/389.1 |
| 4,676,161 | A | * | 6/1987 | Peekna | 101/378 |
| 4,852,490 | A | * | 8/1989 | McEachern | 101/378 |
| 5,019,796 | A | * | 5/1991 | Lee et al. | 335/302 |
| 5,030,937 | A | * | 7/1991 | Loubier et al. | 335/303 |
| 5,384,957 | A | * | 1/1995 | Mohri et al. | 29/895.32 |
| 5,627,505 | A | * | 5/1997 | Iwaszek | 101/389.1 |
| 5,898,352 | A | * | 4/1999 | McEachern et al. | 335/302 |
| 5,938,579 | A | * | 8/1999 | Cavazos | 492/36 |
| 6,062,140 | A | * | 5/2000 | McEachern | 101/389.1 |
| 6,343,419 | B1 | * | 2/2002 | Litman et al. | 29/895.21 |

* cited by examiner

*Primary Examiner*—I. Cuda-Rosenbaum
(74) *Attorney, Agent, or Firm*—Jacobson and Johnson

(57) ABSTRACT

A magnetic cylinder for holding printing plates, embossing plates, die-cutting plates or the like has a plurality of pockets or recesses formed on its outer surface, each of the pockets or recesses containing magnetic elements of permanent bar magnets and interposed pole pieces with the pockets offset circumferentially from one another so that the magnetic holding field will armature with the plate placed on the cylinder at least in part over the entire width and length or breadth of the plate to ensure that the entire plate including the leading and trailing edges are held securely in place while the cylinder rotates.

8 Claims, 5 Drawing Sheets

MODULAR MAGNETIC CYLINDER

FIELD OF THE INVENTION

This invention is to provide a curved magnetic latch or holding device specifically in the form of a magnetic cylinder (or a section of a magnetic cylinder) for use in holding printing plates, embossing plates, and die-cutting plates and the like.

DESCRIPTION OF THE PRIOR ART

U.S. Pat. No. 5,627,505 by Iwaszek describes a magnetic cylinder or drum used for the same purpose as the instant invention in which a series of circumferentially-spaced recesses or grooves are formed transversely or axially across the drum from one side edge to the other with magnetic elements comprising permanent magnets with interspaced pole pieces inserted in the grooves or recesses. In the Iwaszek patent the magnets are arranged with polarity in a circumferential direction.

U.S. Pat. No. 5,938,579 to Cavazos also shows and describes a magnetic cylinder or drum used for a similar purpose. The Cavazos cylinder similarly has circumferentially-spaced slots or recesses extending axially across the drum with magnetic elements comprising permanent magnets and interposed pole pieces inserted in the grooves or slots with the magnets polarized in an axial direction.

In both of the magnetic cylinders described above, the magnetic force armaturing with and holding down the printing plate or embossing or die-cutting plate is concentrated in the area directly over the grooves or slots in which the magnetic elements are resting. In some cases a printing plate or embossing plate or die-cutting plate or the like when placed on the drum or cylinder may have an edge, either a leading edge or a trailing edge or both, resting in the space between the recesses or grooves where there is little if any magnetic holding force to hold the edge down tightly against the cylinder as it is rotating. In some applications, particularly in the field of embossing using magnetic cylinders to hold embossing plates, these dead spots can cause problems. The present invention is aimed at eliminating or at least minimizing the dead spots so that wherever the leading and/or trailing edge of the plate is placed, there will be at least some significant magnetic holding force holding the edge tightly to the cylinder.

SUMMARY OF THE INVENTION

A series or set of recesses or pockets which are circumferentially-spaced from one another formed on the outer surface of a cylinder or drum of non-magnetic material contain magnetic elements comprising permanent magnets and interposed pole pieces. Another similar series or set of circumferentially-spaced pockets or recesses also formed on the outer surface of the drum and containing similar magnetic elements are displaced or offset circumferentially with respect to the first-mentioned set so that they align in an axial direction with the spaces between the pockets in the first mentioned set of pockets. Additional sets of pockets with magnetic elements may be formed transversely or across the width or side-to-side edges of the cylinder so that no matter where a leading or trailing edge of a printing plate or embossing plate is placed on the cylinder, it will cross over a magnetic element contained in one or more recesses so that some significant amount of magnetic holding force is applied to hold the edge of the plate firmly in place on the cylinder.

DESCRIPTION OF THE PREFERRED EMBODIMENTS

Conventionally, a magnetic cylinder 10 is made out of a drum 11 of nonmagnetic material with a conventional axial drive shaft 12. Alternatively, the cylinder may be made out of a drum of steel but with suitable magnetic insulation. The drum might be hollowed out if desired for weight reduction provided that the remaining part of the drum is strong enough for its use in the particular process, whether it's for printing, embossing, die-cutting, or the like. Hereinafter in general the cylinder will be described as it is used in conjunction with a printing plate but it should be understood that the construction and function provides features for other similar type uses, especially for embossing or die-cutting.

Figure 3:
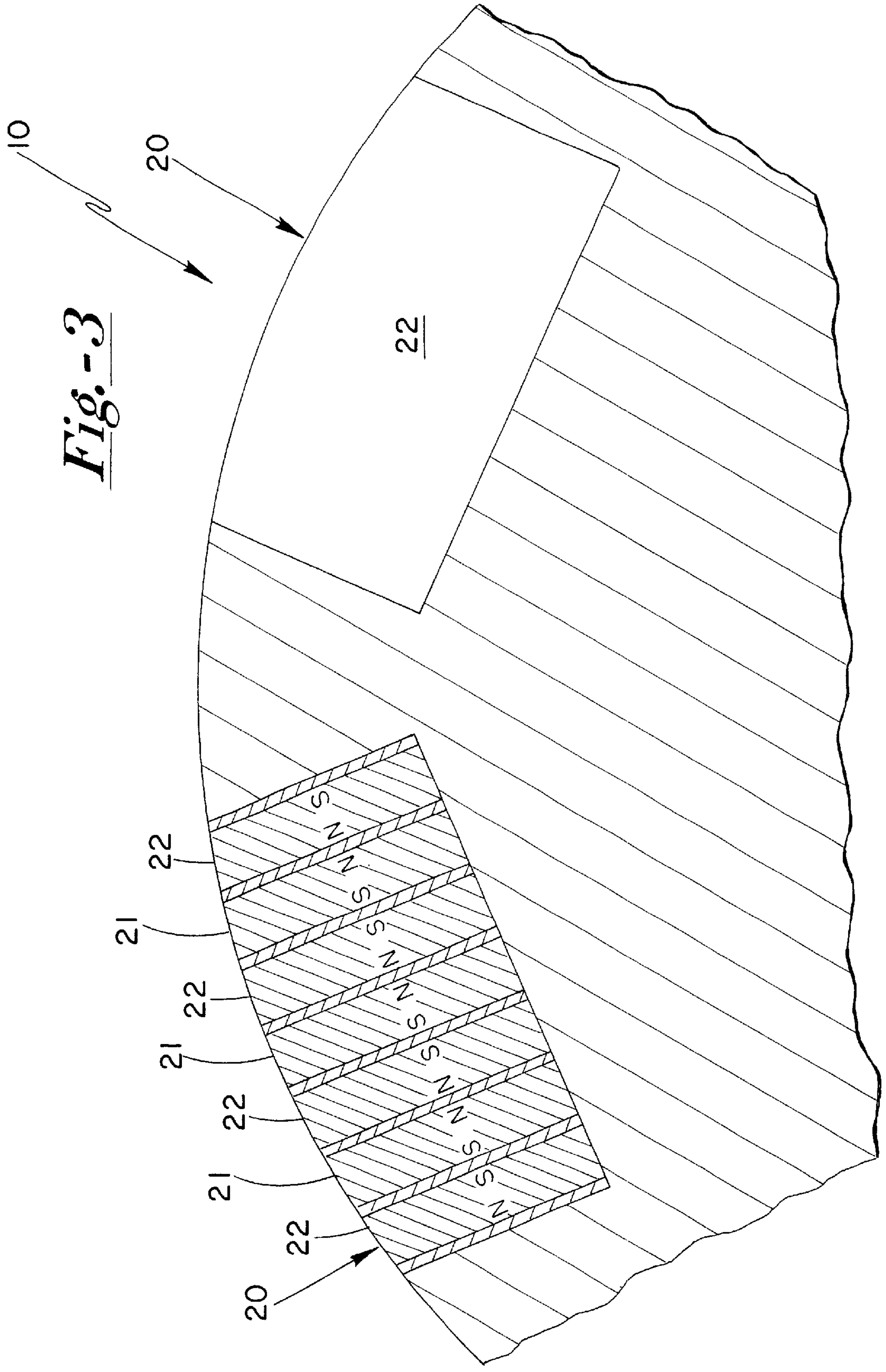
FIG. 3 is a sectioned view of the magnetic elements illustrated in FIG. 2.

A multitude of generally rectangular pockets or recesses 13 are formed on the outer surface of drum 11 transversely or across the width, i.e., from side edge 14 to the opposite side edge 15 of the drum. Pockets 13 are arranged in a set or series generally aligned with one another circumferentially. The set or series of pockets are identified with reference numeral 16 and lettered A through G designating seven rows or sets or series of pockets illustrated in this embodiment. The pockets or recesses 13 in each set have a space or gap 17 circumferentially separating the pockets from one another. The sets identified as 16A–16G are separated axially from one another by gaps or spaces 18. Located in each of the pockets 13 is a magnetic element generally designated by reference numeral 20. The magnetic element 20 comprises permanent bar magnets 21 with interposed pole pieces 22. For illustrative purposes FIG. 3 illustrates magnets 21 being oriented in an axial direction, that is, across the width of the cylinder in one pocket 13A and polarized circumferentially in an adjacent pocket 13B. In conventional fashion pole pieces 22 are alternately polarized north and south thereby producing the magnetic field or force at the surface of the cylinder for armaturing with a plate, such as a printing plate or embossing plate or the like made out of a magnetically permeable material, to provide the magnetic force for holding the plate tightly to the cylinder as it rotates. In general, the pole pieces and magnets in all of the pockets on the cylinder would be polarized in the same direction, either axially or circumferentially, however in some instances it may be advantageous to have some magnetic elements polarized circumferentially and others polarized axially. In any case a magnetically permeable or ferromagnetic plate used for printing, embossing or die-cutting or the like, placed on the surface of cylinder 10 provides an armaturing effect on the lines of magnetic flux extending upward and outward from the respective pole pieces for firmly holding the plate in place against the cylindere while the cylinder is rotating, usually at significantly high speeds.

Figure 1:
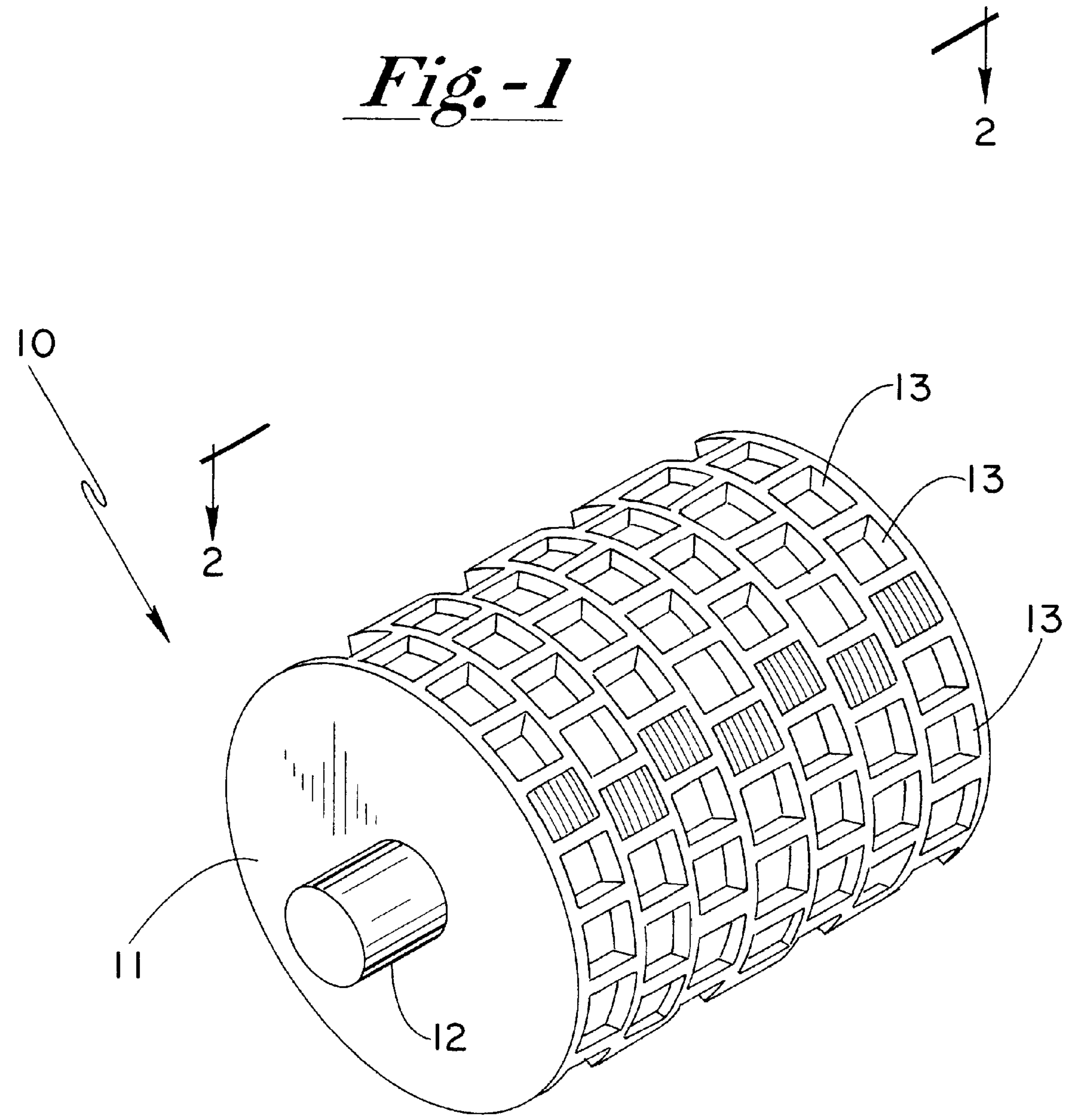
FIG. 1 is an isometric view of an embodiment of the invention.
Figure 2:
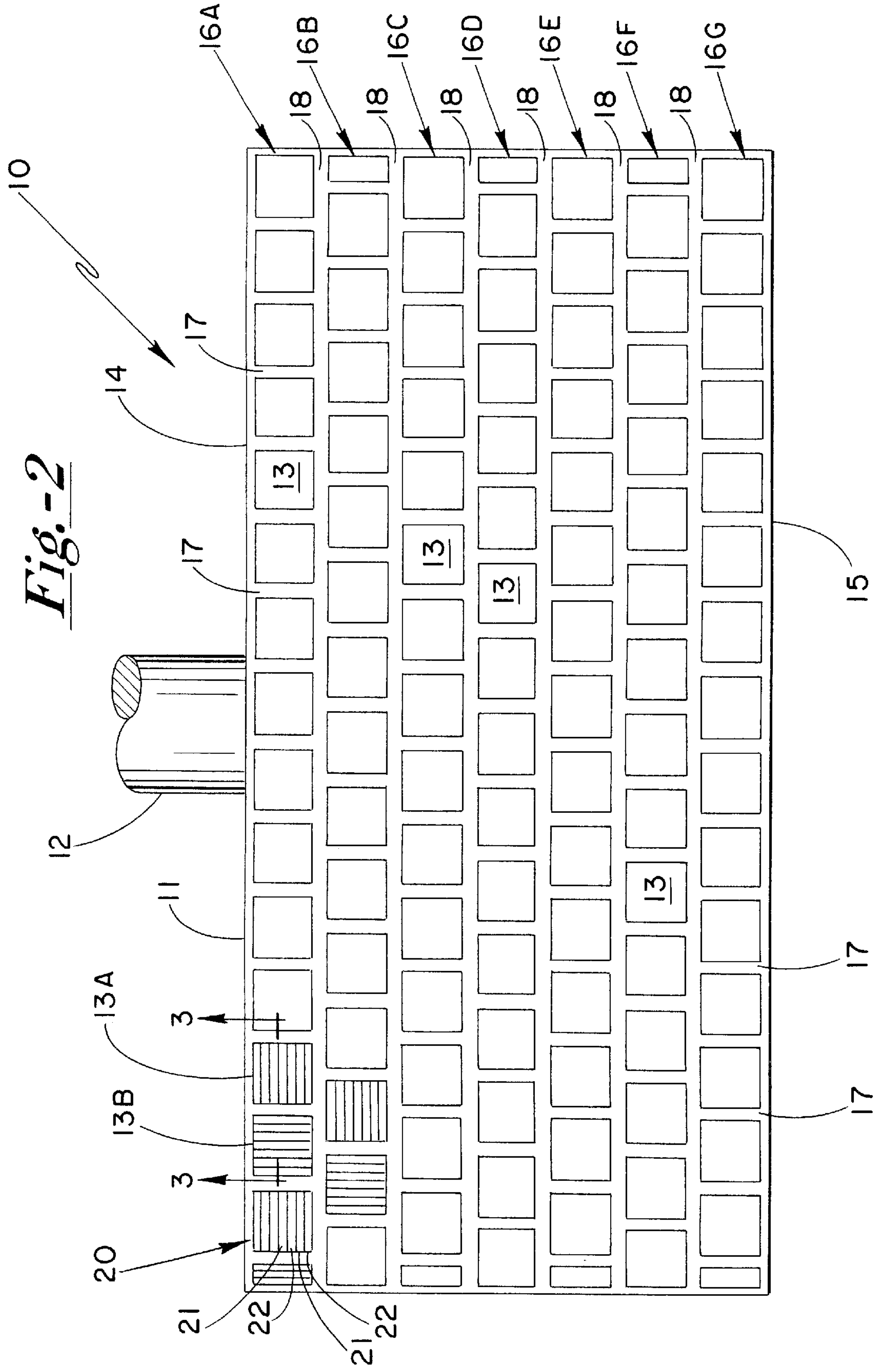
FIG. 2 is an enlarged partial elevation view of the FIG. 1 embodiment with different arrangements of the magnetic elements.

In general, for ease of manufacture the magnets and pole pieces are generally rectangular in shape dimensioned in accordance with the dimensions of the pockets or recesses 13. Although FIG. 1 illustrates the pockets all being of the same uniform size and shape for ease in manufacture, for special applications the pockets can be made of differing dimensions.

Figure 4:
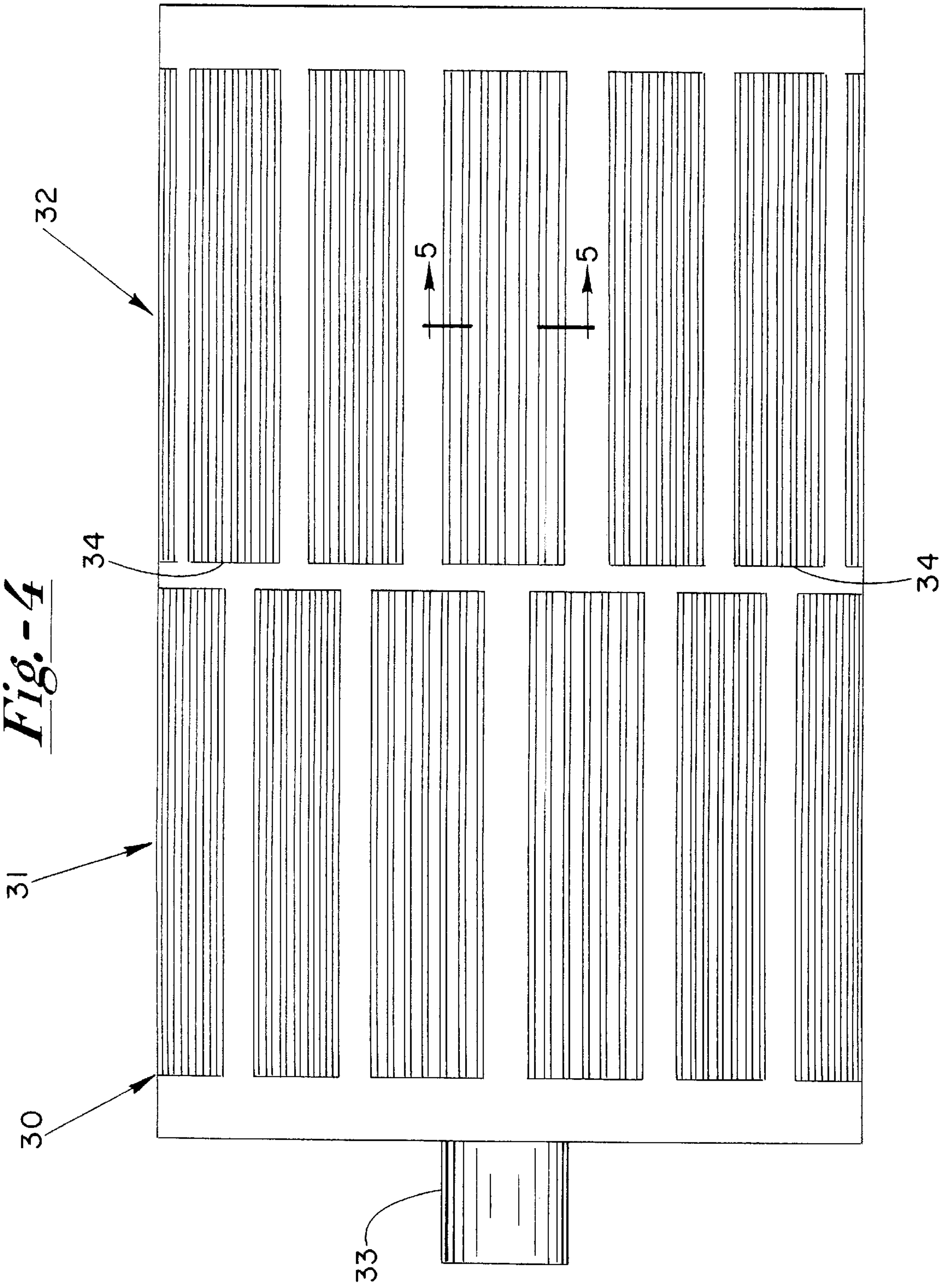
FIG. 4 is a plan view of an alternate embodiment.
Figure 5:
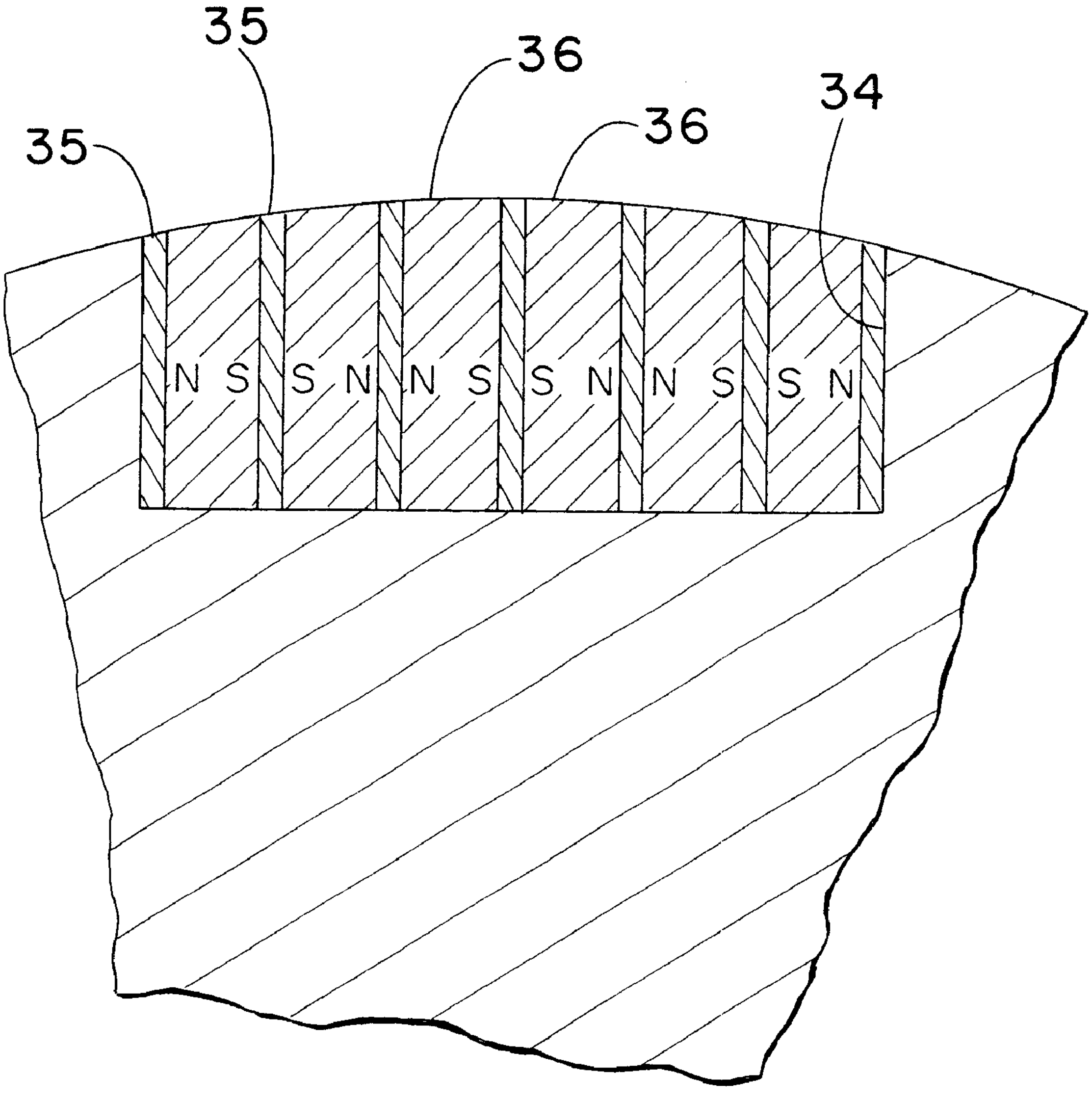
FIG. 5 is an enlarged sectioned view of a magnetic element used in the FIG. 4 embodiment.

All of the rows or sets 16B–G of pockets 13 are arranged and spaced similar to set 16A. However, they are alternately offset circumferentially from one another so that the pockets 13 of one set are aligned generally with the circumferential gaps or spaces 17 of the next adjacent set. Pockets 13 in sets 16B–G contain magnetic elements similar to those in set 16A. The circumferential offset arrangement is alternately repeated with sets of pockets 16B–16G. When a printing plate or the like is placed on the cylinder, the edge of the plate (not shown) which runs transverse to or across the cylinder in an axial direction will have an armaturing effect on at least those magnetic elements in the pockets over which the edge of the plate extends. This holds true whether it is the leading or trailing edge of the plate. Some significant or substantial degree of magnetic holding force provided by the magnetic elements in pockets 13 is applied to the plate at its edges to make sure that the edges are held down firmly against the cylinder during operation of the cylinder. The embodiment illustrated in FIG. 4 is a variation of the magnetic cylinder shown in the '505 Iwaszek patent. A magnetic cylinder 30 has an axial drive shaft 33 and two sets of elongated transverse or axially aligned slots or recesses containing magnetic elements, the sets designated by reference numerals 31 and 32. The right hand set 32 (as observed in FIG. 4) is spaced axially and is offset circumferentially from the set of transverse grooves or slots in set 31. The magnetic element in each of the recesses 34 similar to the Iwaszek patent comprise a plurality of permanent bar magnets 35 polarized circumferentially with interposed or interspaced suitable pole pieces 36. The leading or trailing edge of a plate placed on the cylinder will have a magnetic field armaturing with it at least in part across the width of the cylinder for securing the edge in place as the cylinder rotates.

I claim:

1. A cylinder for magnetically holding a printing plate, comprising:

a) a first set of magnetic elements circumferentially spaced on the outer surface of a magnetically insulated cylindrical drum;

b) another set of circumferentially spaced magnetic elements on the outer surface of said drum spaced axially from said first set;

c) each of the magnetic elements in said another set offset circumferentially from the magnetic elements in said first set to be generally axially aligned with the circumferential spaces between said first set;

d) said magnetic elements comprising permanent magnets with pole pieces between and in close contact with said magnets.

2. A cylinder for magnetically holding a printing plate as described in claim 1 in which the magnets are polarized circumferentially.

3. A cylinder for magnetically holding a printing plate as described in claim 1 in which the magnets are polarized in an axial direction.

4. A cylinder for magnetically holding a printing plate as described in claim 1 in which some magnetic elements have magnets polarized circumferentially and some have magnets polarized in an axial direction.

5. A cylinder for magnetically holding a printing plate, comprising:

a) a magnetically insulated cylindrical drum;

b) a set of circumferentially-spaced recesses formed in the outer surface of said drum;

c) another set of circumferentially-spaced generally parallel recesses formed in the outer surface of said drum spaced axially from said first-mentioned set, each of the recesses in said another set generally axially in line with the space between each of said first set of recesses; and d) a magnetic element inserted in each of said sets of recesses, said magnetic element comprising permanent magnets with pole pieces between and in close contact with said magnets.

6. A cylinder for magnetically holding a printing plate as described in claim 5 in which the magnets are polarized circumferentially.

7. A cylinder for magnetically holding a printing plate as described in claim 5 in which the magnets are polarized in an axial direction.

8. A cylinder for magnetically holding a printing plate as described in claim 5 in which some magnetic elements have magnets polarized circumferentially and some have magnets polarized in an axial direction.

* * * * *